United States Patent [19]
Vargiu et al.

[11] 3,917,522
[45] Nov. 4, 1975

[54] UNSATURATED POLYESTER RESIN COMPOSITIONS

[75] Inventors: Silvio Vargiu; Beppino Passalenti, both of Milan, Italy

[73] Assignee: Societa Italiana Resine S.I.R. S.p.A., Milan, Italy

[22] Filed: Nov. 29, 1974

[21] Appl. No.: 528,315

Related U.S. Application Data

[63] Continuation-in-part of Ser. No. 247,182, April 24, 1972, abandoned.

[30] Foreign Application Priority Data

Apr. 30, 1972 Italy.................................. 23912/72

[52] U.S. Cl...... 204/159.15; 204/159.19; 260/40 R; 260/45.9 R; 260/861; 260/864
[51] Int. Cl.²... C08F 2/50; C08K 5/19; C08L 67/06
[58] Field of Search.................. 204/159.15, 159.19; 260/45.9 R, 40 R, 864, 861

[56] References Cited
UNITED STATES PATENTS 3,819,495  6/1974  Raskott et al.................. 204/159.15

Primary Examiner—Donald E. Czaja
Assistant Examiner—S. M. Person
Attorney, Agent, or Firm—Sughrue, Rothwell, Mion, Zinn & Macpeak

[57] ABSTRACT

The invention provides stable, photochemically curable compositions comprising an unsaturated polyester resin, inert fillers suitable for obtaining the desired finished product, a compound which decomposes under the action of light and a quaternary ammonium compound.

16 Claims, No Drawings

UNSATURATED POLYESTER RESIN COMPOSITIONS

CROSS-REFERENCE TO RELATED APPLICATION

This application is a continuation-in-part of copending application Ser. No. 247,182, filed Apr. 24, 1972, and now abandoned, of Silvio Vargiu et al., entitled UNSATURATED POLYESTER RESIN COMPOSITIONS.

The present invention relates to photo-chemically curable unsaturated polyester resin compositions and processes for manufacturing the same.

The term unsaturated polyester resins denotes the products of reaction of acrylic or vinyl monomers with condensation products of polyhydroxy alcohols and polycarboxylic acids, one or the other being non-aromatically unsaturated, in the presence of saturated acids having a modifying action.

In the prior art, it is known to be possible to cure unsaturated polyester resins photochemically in the presence of substances which decompose under the effect of light, particularly ultra-violet light.

For many industrial purposes, for example the production of putty or for use in the lining of plywood, chipboard or metal panels, it is particularly important to be able to photochemically cure compositions comprising inert fillers incorporated into the unsaturated polyester resins.

However, numerous disadvantages are occasioned by the fact that, in the presence of substances which decompose under the effect of light, compositions of unsaturated polyester resins and inert fillers have unduly limited stability over a period of time, so that they permit of only short periods of storage (shelf life).

It has now been found possible to obtain compositions of photochemically curable unsaturated polyester resins which are stable when stored for long periods of time.

Such compositions, which constitute one of the objects of the present invention, comprise an unsaturated polyester resin, inert fillers suitable for obtaining the desired finished product, a compound which decomposes under action of light and a quaternary ammonium compound.

Such compositions are cured by the action of light, without the supply of heat and in the absence of peroxide compounds.

The essential aspect of the present invention is the presence of the quaternary ammonium compounds in the compositions.

More particularly, in order to guarantee that the compositions will have the best characteristics of stability in course of time, the quaternary ammonium compounds should be present in quantities from 0.005 to 1 part by weight with respect to 100 parts by weight of unsaturated polyester resin.

As quaternary ammonium compounds, compounds belonging to the class which can be represented by the following structural formula can be used:

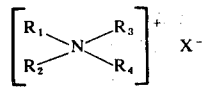

in which R1, R2, R3 and R4 represent alkyl, aryl (including phenol), or aralkyl radicals, while X represents a halogen.

Trimethylbenzylammonium chloride, triethylbenzylammonium chloride, tetramethylammonium chloride and tetraethylammonium chloride have been found particularly suitable for the purpose.

In the preferred embodiment of the compositions of the present invention, trimethylbenzylammonium chloride is used in a quantity of 0.005 to 1 part by weight to 100 parts by weight of unsaturated polyester resin.

As is stated hereinabove, the term unsaturated polyester resins implies the products of reaction of monomers of the acrylic or vinyl type with the products which are obtained by condensation of a polyhydroxy alcohol with a polycarboxylic acid, a non-aromatic unsaturation being present in one or the other, in the presence of saturated acids having a modifying action.

Usually, arylvinyl compounds, and particularly styrene, are used, in combination with the products of polycondensation of saturated dihydroxy alcohols with unsaturated dicarboxylic acids such as for example maleic, fumaric, itaconic and citraconic acids, in the presence of phthalic acid. Succinic, adipic and azelaic acids may also be used as saturated acids with a modifying action.

In the unsaturated polyester resin, the quantity of acrylic or vinyl monomer is preferably comprised between 20 and 70% by weight. The product of polycondensation furthermore preferably has an acid number comprised in the range from 25 to 50 and a viscosity from R to Y, the value being determined on the Gardner scale in a 60% by weight solution in styrene.

The said characteristics may be obtained by measuring out the relative quantities of monomers and by regulating the conditions of polycondensation according to procedures belonging to the state of the art.

As inert fillers, it is possible to use any products suitable for the purpose. The choice of fillers depends solely upon the use for which the desired finished products are intended.

For example, when the desired finished products are putties, talcum, asbestine, barytes, silica or precipitated calcite are used; when the desired finished products are, on the other hand, coatings or linings in general, then calcium sulphate, kaolin, calcite and talcum are used.

The photosensitive compounds used for the purposes of the present invention are those commonly used in the art, such as benzoin; benzoin alkyl ethers, particularly benzoin isopropylethylmethyl ether; organic disulphides and particularly dibenzyl disulphide; dibenzoyl; organic sulphonyl chlorides, particularly paratoluene sulphonylchloride and naphthalene sulphonylchloride; organic acid fluorides; halogenated polycyclic hydrocarbons; and polyaldehydes of the aromatic type.

For curing the compositions of the present invention by irradiation with light, particularly with a wavelength of 2,500 to 4,000 A, a concentration of 0.2 to 5% by weight is preferred for the photosensitive compounds.

The compositions of the present invention offer numerous advantages; in particular, they are characterised by high stability when stored for several months, at least 5 months, at ambient temperature. Furthermore, when they are irradiated with light, particularly light with a wavelength of 2,500 to 4,000 A, they give rise to colourless and perfectly cured products.

A further, important advantage of the compositions of the present invention derives from their high rate of curing.

In order to obtain compositions according to the present invention, it is necessary initially to prepare unsaturated polyester resins.

For this purpose, unsaturated polycarboxylic acids are caused to react with polyhydroxy alcohols, in the presence of phthalic acid, in order to obtain a resin with an acid number from 25 to 50 and a viscosity, measured on the Gardner scale at ambient temperature and in a 66% by weight solution in styrene in the range from R to Y.

In the preferred embodiment of the present invention, maleic and/or fumaric acids are caused to react with ethylene and/or propylene glycol, in a molar ratio of from 1.02:1 to 1.2:1 in the presence of phthalic acid, in such quantity that the molar ratio of the maleic and/or fumaric acids to the phthalic acid is from 0.5:1 to 3:1.

The reaction temperature is preferably from 150° to 200°C.

After cooling to 100°C, the product of polycondensation is diluted with styrene in such a quantity that the viscosity of the end product, measured with a Hubbelhode viscosimeter, is from 600 to 1,500 cps.

At the same time, it is possible also to add the other additives usually added to unsaturated polyester resins (wetting agents, curing activators, etc).

After cooling to 25° to 30°C, the photosensitive substance and the quaternary ammonium compound are added to the unsaturated polyester resin.

The quaternary ammonium compound may be added to the resin after having been previously dissolved in a suitable solvent, preferably in a polar solvent such as an alcohol or a glycol, in a quantity of 10 to 80% by weight.

The product obtained is finally, with agitation, blended with suitable inert fillers until a homogeneous dispersion is obtained with an unsaturated polyester resin content of 30 to 80% by weight, the remainder essentially consisting of the inert fillers.

In some cases, in order to facilitate homogenisation of the compositions, there may be a further addition of styrene together with or immediately after the inert fillers. In any case, the styrene content in the final composition should not exceed 50% by weight.

The invention will now be illustrated by the following examples, which are not intended to constitute any limitation of the invention.

EXAMPLE 1

Phthalic anhydride, maleic anhydride and propylene glycol in a molar ratio 1:1.25:2.42 were introduced into a glass vessel fitted with an agitator, thermometer and an inert gas injector system. The temperature was gradually raised to approximately 190°C and these conditions were maintained until a product was obtained which had a Gardner viscosity of U - V (measured in 66% styrene solution) and an acid number of 45 to 50.

This product was then brought to 100°C and diluted with styrene containing 20 ppm hydroquinone, 30 ppm of paratertiarybutylaatechol and 20 ppm copper naphthenate.

Cooling to ambient temperature brought the viscosity to approximately 1,000 cps, measured by means of a Hubbelhode viscosimeter.

To 100 parts by weight of the resin produced in this way, was added 1 part by weight of photosensitive substance, consisting of benzoin isopropylether and 0.1 part by weight trimethylbenzylammonium chloride, previously dissolved in propylene glycol in a quantity equal to 20% by weight.

The gelling time of the resin was regulated, by the addition of paratertiarybutyl catechol, to approximately 6 to 9 minutes at 25°C.

The gelling time was determined in the following manner: to 100 g unsaturated polyester resin were added 0.2 ml of cobalt octoate solution with a 6% cobalt metal content.

After blending in a thermostatically controlled bath kept at 25°C, 1.5 ml of 50% methylethylketoneperoxide were added. Rapid homogenisation was performed and time measurement commenced.

The progress of viscosity was followed by means of a glass rod every 30 to 60 seconds. The gelling time can be defined as the period of time which elapses from homogenisation of the mixture with the peroxide to the moment at which resin raised with the glass rod clings to it.

The product obtained as above, constituted essentially by the unsaturated polyester resin, the photosensitive substance and the quaternary ammonium compound, was then charged to a vessel fitted with an agitator where, while stirring, 50 parts by weight talcum, 25 parts by weight barium sulphate, 70 parts by weight calcium carbonate, 30 parts by weight asbestine and 1 part by weight silica were added.

Then a further 50 parts by weight styrene were added and the mixture was maintained under agitation until thoroughly homogenised.

The resultant composition was particularly suitable for putties.

The accelerated stability was then determined:

50 g of the product were placed in a glass phial of approximately 50 ml capacity. After the phial had been closed, it was placed in a thermostatically controlled oven set at 65°C. The appearance and consistency of the product were checked every 15 to 20 hours, once the sample had been reduced to room temperature. When it was found that the product in the phial had hardened, the test was regarded as completed.

The time elapsing between introduction of the phial into the oven and the appearance of the hardened product was regarded as the accelerated stability time.

It is presumed that a stability of 1 day at 65°C corresponds to the stability of 1 month at room temperature.

The accelerated stability at 65°C, determined in this way, proved to be 7 days.

EXAMPLE 2

The same procedure was adopted as is described in Example 1, 0.2 parts by weight trimethylbenzylammoniumchloride being however used to 100 parts by weight of resin. A product was obtained with an accelerated stability of 12 days at 55°C. The hardness was then determined by Albert Koenig's method.

For this purpose, part of the composition obtained was spread on a glass slide measuring 8 × 17 cm, in the form of a film 200 microns thick.

After the slide has been left exposed to the air for 10 minutes, it was placed in a tunnel and exposed to irradiation from an OSRAM L 40 W 73 40 Watt lamp for 5 minutes. In particular, a distance of 10 cm was maintained between the source of radiation and the film.

After irradiation, the slide was allowed to cool to room temperature for 10 minutes and then the hardness was determined by means of an Albert Koenig pendulum. For this purpose, the slide was placed on the appropriate bed and the pendulum released.

Once the oscillatory movement had dropped to position 3, counting of the seconds commenced. The hardness, using the Albert Koenig method of evaluation, was 51''.

EXAMPLE 3 (COMPARATIVE)

The same procedure was adopted as in the preceding examples, without the addition of trimethylbenzylammonium chloride. A product was obtained with an accelerated stability at 65°C equal to 0.75 days and with an Albert Koenig hardness of 50''.

EXAMPLE 4

The same procedure was adopted as in Example 1, but 1.5 parts by weight of photosensitive substance, constituted by benzoinethylether, and 0.2 parts by weight of trimethylbenzylammoniumchloride in a 20% propylene glycol solution, were used. A product was obtained with an accelerated stability at 65°C equal to 7 days.

EXAMPLE 5

The same procedure was adopted as in the preceding example, 0.5 parts by weight trimethylbenzylammoniumchloride in a propylene glycol solution being used. A product was obtained with an accelerated stability at 65°C equal to 11 days.

EXAMPLE 6

The same procedure was adopted as in Example 1, but 2 parts by weight of photosensitive substance, consisting of benzoinisopropylether, and 0.2 parts by weight trimethylbenzylammoniumchloride in 20% propylene glycol solution, were used. A product was obtained with an accelerated stability at 65°C equal to 5 days.

EXAMPLE 7

The same procedure was adopted as in the preceding example, but 0.4 parts by weight trimethylbenzylammoniumchloride in 20% propylene glycol solution were used. A product was obtained with an accelerated stability at 65°C of 10 days and with an Albert Koenig hardness of 64''.

EXAMPLE 8

The same procedure was adopted as in the preceding example, but 0.6 parts by weight trimethylbenzylammoniumchloride in 20% propylene glycol solution were used. A product was obtained with an accelerated stability at 65°C equal to 13 days.

EXAMPLE 9 (COMPARATIVE)

To 100 parts by weight of the unsaturated polyester resin produced as in Example 1 were added 1.5 parts by weight of photosensitive substance consisting of benzoinisopropylether.

The gelling time of the resin was adjusted to 6 to 9 minutes at 25°C by means of paratertiarybutylcatechol.

95 parts by weight of talcum were then added to the resultant product, with agitation. The composition obtained, which was suitable for plasters and fillers, had an accelerated stability at 65°C of 0.75 days and an Albert Koenig hardness of 45''.

EXAMPLE 10 (COMPARATIVE)

A flask equipped with agitation and cooling means, a thermometer and means for the injection of inert gas was charged with reagents consisting of propylene glycol, fumaric acid and phthalic anhydride.

Organic phosphite, when used, was also added, in quantities as specified.

Then heat was applied while nitrogen was caused to flow, the temperature being raised gradually to about 160°C. with the agitator running.

Next, the temperature was raised by 5°C. every hour to a level of 200° to 205°C., this being maintained until the reaction product had a Gardner viscosity of between U and V, ascertained in a solution containing 66 percent by weight of styrene.

The whole was then cooled to about 150°C. and hydroquinone and the quaternary ammonium salt, when used, were added.

Dilution with styrene was carried out at a temperature of 90° to 100°C., to bring the styrene content of the composition to approximately 65 percent by weight.

The light-sensitive substance was added to the unsaturated polyester at a temperature of 40°to 50°C., agitation being maintained until solution was complete.

Stability tests on the unsaturated polyester compositions were made by placing specimens in a temperature-controlled atmosphere at 64° ± 1°C.

Every day of stability at that temperature is equivalent to 1 month of stability of the said specimens when kept in the dark, out of contact with peroxides, at ambient temperature (approx. 20°C.).

During the hardening of the unsaturated polyester compositions, the specimens, in the form of film, were irradiated with ultraviolet light produced by a 125W upright lamp of 5720B/00 (Philips) type.

The thickness of the film, stretched over a sheet of glass, was maintained in all cases at a constant value of 200 microns.

The film was exposed to the action of the light at a constant distance of 10 cm. for a period of 5 minutes and then for a further 5 minutes after the test piece had been rotated to a position at 90 to the first.

Thirty minutes after the end of irradiation, the hardness of the specimen was measured by Koenig pendulum.

The procedure described was adopted, with the polycondensation of:

2.45 mols of propylene glycol
1.25 mols of fumaric acid
1.50 mols of phthalic anhydride to which triphenyl phosphite was added in a quantity such as to bring the content thereof in the polyester composition to about 500 p.p.m.

Condensation was continued until the acid No. was 45.

Upon the completion of reaction, cooling to 150°C. was applied, hydroquinone (50 p.p.m.) and trimethylbenzyl-ammonium chloride (300 p.p.m. related to the final composition) were added and then dilution with styrene was carried out at approximately 90°C. until the content thereof in the composition was 65 percent by weight.

Finally, 2-naphthyl sulphonyl chloride, to the extent of 1 percent by weight, was added at 40°C.

When hardened as described in this specification, the result was a brilliant film having a hardness of 120 inch measured by Koenig pendulum.

The composition had a stability of more than 4 months at 20°C.

When this Example was carried out in the absence of triphenyl phosphite, the stability of the composition was of the order of 2 months.

When this Example was carried out in the absence of the trimethylbenzyl-ammonium chloride, the stability of the composition was of the order of 1 to 1.5 months.

From Example 10, it is seen that the absence of either of the two components of the stabilizer system of U.S. Pat. No. 3,616,366 by Passalenti, lowers the stability of the respective compositions to unacceptable values. These compositions do not contain fillers. In comparison therewith, the Examples of the present invention demonstrate that when the composition contains inert filler in the quantity conventionally found in stuccos (20 to 70% by weight), the quaternary ammonium compound alone is sufficient for stability purposes.

We claim:

1. In an unsaturated polyester resin composition which is photochemically curable by exposure to light consisting essentially of:
   1. from 30 to 80% by weight based on the total weight of the composition, of an unsaturated polyester resin comprising the condensation product of a polyhydroxy alcohol and a polycarboxylic acid, said condensation reaction being conducted in the presence of a saturated acid having a modifying action, at least one of said polyhydroxy alcohol and said polycarboxylic acid having non-aromatic unsaturation, said unsaturated polyester resin having a viscosity, measured with a Hubbelhode viscosimeter, of between 600 and 1,500 centipoises;
   2. from 20% to 70% by weight, based on the total weight of the composition of an inert filler;
   3. from 0.2 to 5% by weight, based on the total weight of the composition, of a compound which decomposes upon irradiation with light to initiate the photochemical curing reaction; and
   4. from 20% to 70% by weight, based on the total weight of the composition, of an acrylic or vinyl monomer, said monomer reacting with said condensation product upon light irradiation to cure said composition; the improvement consisting essentially of a stable photochemically curable polyester resin composition which consists essentially of, in addition to said unsaturated polyester resin, said inert filler, said decomposible compound and said monomer, from 0.005 to 1% by weight, based on the weight of said unsaturated polyester resin, of a quaternary ammonium compound represented by the formula:

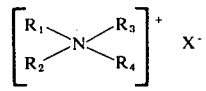

wherein $R_1$, $R_2$, $R_3$ and $r_4$ each represents alkyl, aryl, including phenol, or aralkyl and wherein X represents halogen.

2. The composition of claim 1 wherein said quaternary ammonium compound is trimethylbenzylammoniumchloride, triethylbenzylammoniumchloride, tetramethylammoniumchloride or tetraethylammoniumchloride.

3. The composition of claim 1 wherein said quaternary ammonium compound is trimethylbenzylammoiumchloride.

4. The composition of claim 1, wherein said condensation product has an acid number of from 25 to 50 and a viscosity, measured on the Gardner scale in a 66% by weight solution in styrene, within the range R to Y.

5. The composition of claim 1 wherein said decomposable compound is selected from the group consisting of benzoin, benzoin alkyl ethers, organic disulphides, dibenzoyl, sulphonyl chlorides, organic acid chlorides, halogenated polycyclic hydrocarbons and aromatic polyaldehydes.

6. The composition of claim 4 wherein said condensation product is the condensation product of a saturated dihydroxyl alcohol and an unsaturated dicarboxylic acid, said condensation reaction being conducted in the presence of a saturated acid selected from the group consisting of phthalic acid, succinic acid, adipic acid and azelaic acid, and wherein said acrylic or vinyl monomer is an arylvinyl compound.

7. The composition of claim 6 wherein said arylvinyl compound is styrene and wherein said unsaturated dicarboxylic acid is selected from the group consisting of maleic, fumaric, itaconic and citraconic acids.

8. The composition of claim 6 wherein said inert filler is selected from the group consisting of talcum asbestine, barytes, silica and precipated calcite.

9. The composition of claim 6 wherein said inert filler is selected from the group consisting of calcium sulphate, kaolin, calcite and talcum.

10. The composition of claim 6 wherein said decomposable compound is selected from the group consisting of benzoin, benzoin isopropylethylmethyl ether, dibenzyl disulphide, dibenzoyl paratoluene sulphonylchloride, naphthalene sulphonylchloride, organic acid fluorides, halogenated polycyclic hydrocarbons and aromatic polyaldehydes.

11. The composition of claim 6 wherein said unsaturated polyester resin composition is photochemically-curable by irradiation with light having a wave length of from 2500 to 4000 Angstroms without any additional supply of heat and in the absence of peroxide compounds.

12. The composition of claim 6 wherein said condensation product is the condensation product of an unsaturated dicarboxylic acid selected from the group consisting of maleic acid, fumaric acid and mixtures thereof with a dihydroxyl alcohol selected from the group consisting of ethylene glycol, propylene glycol and mixtures thereof, said unsaturated acid being condensed with said alcohol in a molar ratio of unsaturated acid/alcohol of from 1.02/1 to 1.2/1 in the presence of phthalic acid, the phthalic acid being present in an amount such that the molar ratio of said unsaturated acid/phthalic acid varies from 0.5/1 to 3/1.

13. The composition of claim 7 wherein said unsaturated polyester resin composition further consists essentially of additional styrene other than the styrene present in said unsaturated polyester resin, the total styrene content of the composition not exceeding 50% by weight, based on the total weight of the composition.

14. The composition of claim 4, wherein said composition consists of said unsaturated polyester resin, said inert filler, said decomposable compound, said monomer and said quaternary ammonium compound.

15. The composition of claim 14, wherein said quaternary ammonium compound is trimethylbenzylammoniumchloride, triethylbenzylammoniumchloride, tetramethylammoniumchloride or tetraethylammoniumchloride.

16. The composition of claim 14, wherein said saturated dihydroxyl alcohol is selected from the group consisting of ethylene glycol, propylene glycol and mixtures thereof; and wherein said unsaturated dicarboxylic acid is selected from the group consisting of maleic, fumaric, itaconic and citraconic acids.

* * * * *

UNITED STATES PATENT AND TRADEMARK OFFICE
CERTIFICATE OF CORRECTION

PATENT NO. : 3,917,522
DATED : November 4, 1975
INVENTOR(S) : Silvio Vargiu et al It is certified that error appears in the above-identified patent and that said Letters Patent are hereby corrected as shown below:

UNDER "FOREIGN APPLICATION PRIORITY DATA":

Delete "30th April 1972", and insert -- 30th April 1971

Signed and Sealed this sixteenth Day of March 1976

[SEAL]

Attest:

RUTH C. MASON
Attesting Officer

C. MARSHALL DANN
Commissioner of Patents and Trademarks